Figure 1:
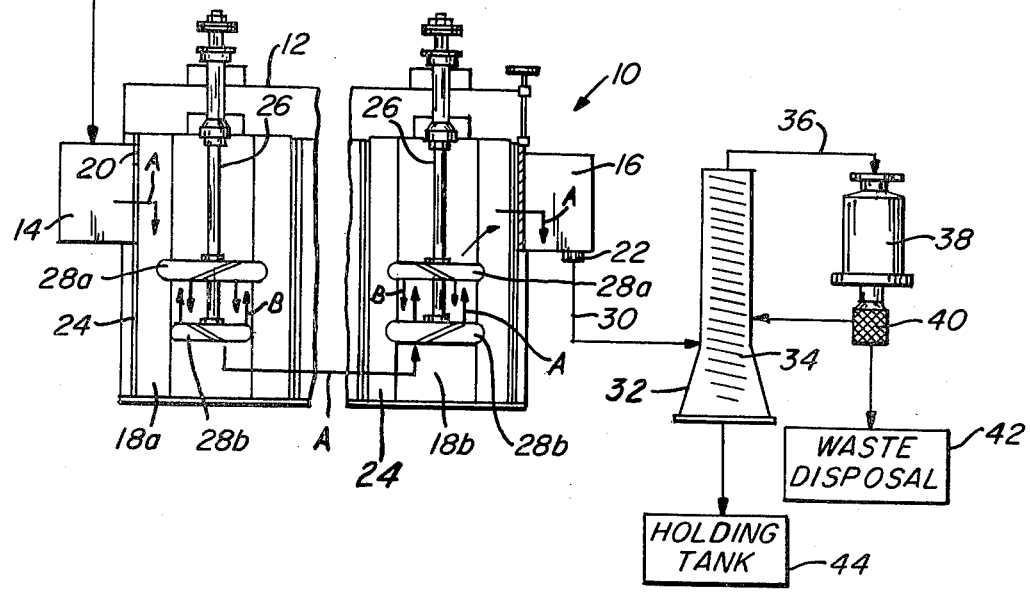

United States Patent [19]

Gisler

[11] 4,261,953
[45] Apr. 14, 1981

[54] LIME SLAKING APPARATUS

[75] Inventor: Henry J. Gisler, Denver, Colo.

[73] Assignee: Joy Manufacturing Company, Pittsburgh, Pa.

[21] Appl. No.: 16,260

[22] Filed: Feb. 28, 1979

[51] Int. Cl.³ ............................ C04B 1/08; B01F 7/20
[52] U.S. Cl. .................................... 422/162; 422/225; 423/640
[58] Field of Search ................. 422/162, 225; 423/640

[56] References Cited

U.S. PATENT DOCUMENTS

| 773,030 | 10/1904 | Reaney | 423/640 X |
|---|---|---|---|
| 803,506 | 10/1905 | Reany | 423/640 |
| 845,190 | 2/1907 | Osborne | 423/640 X |
| 1,204,699 | 11/1916 | Schofield | 423/640 |
| 1,565,107 | 12/1925 | Rich | 423/640 X |
| 1,679,149 | 7/1928 | Berg | 423/640 |
| 1,954,211 | 4/1934 | Kuntz | 422/162 X |
| 1,960,756 | 5/1934 | Sewell et al. | 422/162 X |
| 2,147,191 | 2/1939 | Carson | 423/640 |
| 2,888,324 | 5/1959 | Allen | 422/162 X |
| 3,054,230 | 9/1962 | Logue | 366/291 X |
| 3,066,016 | 11/1962 | McKinley et al. | 422/162 |
| 3,170,770 | 2/1965 | Bousman et al. | 422/162 |
| 3,573,002 | 3/1971 | Zimmerman et al. | 422/162 |

Primary Examiner—Barry Richman
Attorney, Agent, or Firm—J. Stewart Brams

[57] ABSTRACT

An improved lime slaking system including agitator means effective for mechanical comminution of particulate lime during the hydration thereof.

9 Claims, 2 Drawing Figures

FEED

LIME SLAKING APPARATUS

In the art of line slaking or hydration as heretofore known and practiced various types of apparatus and methods have been utilized to provide hydrated lime which is used, for example, in wet or dry flue gas desulfurization systems such as are commonly associated with coal burning electric power generating stations or other fossil fueled process plants. The slaking process is the exothermic hydration reaction of water with calcined lime (quicklime). Often in the art "slaking" has been used to refer to a process utilizing large amounts of excess water to distinguish from hydration processes wherein only sufficient water is used; however, for purposes of the following disclosure the terms hydration and slaking are used interchangably.

Examples of known lime slaking systems include U.S. Pat. No. 1,204,699, which discloses a system including an elongated reaction vessel and a series of oppositely pitched agitator blades which rotate slowly to control flow of the quicklime and water mass through the vessel. Other U.S. patents including U.S. Pat. Nos. 845,190; 1,565,107; 1,679,149; 2,888,324 and 3,066,016 typify prior lime slaking systems in which the quicklime and water mass is contained in a reaction vessel and is gently agitated during the hydration process by one of various stirring or mixing means such as plural blades or paddles, a rotating drum, or rake and bowl structures to maintain a uniform mix of quicklime and water or to slowly advance the mix through the reaction vessel as the hydration reaction proceeds. Many prior lime slaking systems, such as in the above mentioned U.S. Pat. Nos. 845,190 and 1,679,149, have required grinding or milling of the quicklime input as by passing it through a milling device such as a ball mill or a hammer mill prior to its being added to the reaction vessel, and this is often referred to as 100 percent grinding of the quicklime.

Another variety of known lime slaking system comprises a milling device such as a ball mill which is in closed circuit with a classifier apparatus, for example a spiral classifier. In this system the quicklime and water are passed as a stream through the ball mill for 100 percent grinding to form a lime slurry, and the mill fulfills two purposes as follows: first, it is operative as a comminution device for size reduction of the calcined lime particles and particulate impurities, and second, it is a reaction chamber wherein the hydration reaction proceeds. The slaked lime is directed to the spiral classifier for separation of particulate impurities such as silica and residual, oversized quicklime particles from the slaked lime and the separated particulates and residual quicklime are then recycled to the ball mill. Inasmuch as the ball mill in such systems functions as a reaction chamber, very little lime hydration occurs in the spiral classifier itself.

Although these and other prior lime slaking systems have generally served their intended purposes, they have nevertheless often been subject to various shortcomings. For example, in prior systems requiring a mill for 100 percent grinding of the quicklime prior to its addition to a reaction vessel, the milling device has been a relatively large cost factor in the system due to the relatively high cost of milling capacity. This is particularly true of the last mentioned slaking system in which the mill must be of sufficient capacity to be utilized both as a comminution device and as a reaction chamber in which the hydration reaction may proceed virtually to completion in order to minimize the quantity of unreacted quicklime in the mill output. Thus, the mill often may be not only cost inefficient as a capital expenditure but in addition may be a process bottleneck due to its limitations as a reaction vessel.

Of course, lime slaking without initial 100 percent grinding of the quicklime is known, but this approach often has resulted in relatively large amounts of residual, unreacted quicklime in the hydrated lime mass, and thus has been undesirably wasteful of increasingly more expensive materials.

As noted hereinabove, many prior lime slaking systems have included means for gentle agitation of the lime and water mass within a reaction vessel; however, such agitators have served only to maintain a uniform mix of lime and water or to slowly advance the mixture through the reaction vessel in a controlled manner. For example, U.S. Pat. Nos. 1,204,699 and 2,888,324 disclose the use of agitator speed reduction means to provide gentle agitation of the lime and water mass. According to these patents, the agitators slowly sweep the entire cross sectional area of the reaction vessel to uniformly advance the lime and water mass through the reaction vessel. Other known agitators are intended to provide for uniform distribution of the water throughout the lime mass, as disclosed in U.S. Pat. No. 803,506 for example. Known lime slaking agitation devices thus have not materially enhanced system throughput capacity inasmuch as they have not alleviated those conditions which tend to inhibit the hydration reaction rate. For example, in the prior art, the common mechanism of hydration has included rapid hydration of the pellet exterior surface followed by more gradual hydration of interior pellet portions with a consequent heating of the pellets until the individual pellets explode. This mechanism is less predictible and produces a less uniform reaction than a receding surface mechanism wherein the hydrated lime pellet surface would be removed as it forms. Conventional lime slaking system agitators have not been able to remove hydrated surface portions from the quicklime pellets in significant enough quantities to materially enhance the hydration process.

It may be noted here that effective quicklime particle comminution is not provided by mere intensity of agitation. Rather, the specific mechanics of the agitation are the determining factor. To be effective for quicklime particle comminution an agitator must promote high intensity rubbing or abrasion of quicklime particles in the lime mass whereby the abrasion of the particles will be effective to remove the slaked lime surface therefrom. The mere intensification of known lime slaking system agitation processes, if effected, would not provide such a receding surface mechanism inasmuch as the number of high intensity particle contacts would not be significantly increased thereby, other factors being equal. Thus, increased mechanical energy input to prior art agitators would have produced no significant benefit. In addition, it is noted that the prior art teachings of gentle or mild agitation are consistent with concerns that anything which might promote a substantially higher reaction rate must be approached with caution in that it is conceivable under such circumstances that an uncontrollable temperature and reaction rate excursion could occur.

Other related shortcomings of prior practice and teaching include the requirement in some cases to add large amounts of excess water to the quicklime for purposes of temperature control as taught by U.S. Pat. No.

2,888,324, for example. This produces a low density of lime solids in the water and dissipates heat needed to sustain the hydration reaction. This and the resulting requirement for system capacity sufficient to separate large excess volumes of water from the slaked lime adversely influence system production capacity.

These and other shortcomings of prior lime slaking systems and practice are overcome by the present invention according to which there is provided a lime slaking method and apparatus including the use of an attrition scrubbing apparatus as a reaction chamber means wherein the contents of the scrubber vessel follow a progressive course of movement under the impetus of associated and cooperative concurrent and countercurrent impelling influences with a high degree of particle attrition deriving from the opposed impelling influences. In its use for lime slaking, the agitators of the attrition scrubbing apparatus provide vigorous countercurrent flow of a lime and water mass of high solids concentration to cause the quicklime pellets to abrade against one another as the hydration reaction proceeds thus promoting an effective receding surface reaction mechanism whereby the slaked lime surface of the pellets is continuously removed to expose unreacted pellet portions to the water for continued, uniform reaction until the hydration reaction has proceeded virtually to 100 percent completion. The invention obviates the need for preliminary milling of the quicklime pellets and can tolerate a wide variation in particulate impurities in the lime and water mix, quicklime pellet size, and other process variables.

The present invention may further include a residuals processing system portion including a classifier and a relatively small mill such as a ball mill connected such that the hydrated lime is fed to the residuals processing portion of the system from the attrition scrubber for processing of unreacted quicklime and particle impurities.

Some advantages of the invention include:
1. Easy maintenance of a sufficiently high reaction vessel temperature in the attrition scrubber due to the high net energy input from the connected impeller horsepower and the high solids concentration in the lime mass.
2. 100 percent grinding of the quicklime is not required and the smaller mill requirement therefore offers a capital cost savings. In some cases the mill may be eliminated entirely thereby reducing system maintenance requirements;
3. The lime slaking process can be controlled at a higher density of quicklime in water and over a wide range of densities. Thus the system can be made more responsive to changes in slaking requirements;
4. The capital investment in the system is lower than for heretofore known systems of comparable production capacity.
5. The receding surface reaction mechanism provides a more uniform and easily controlled reaction even at higher reaction rates than commonly thought to be advisable heretofore.

Figure 2:
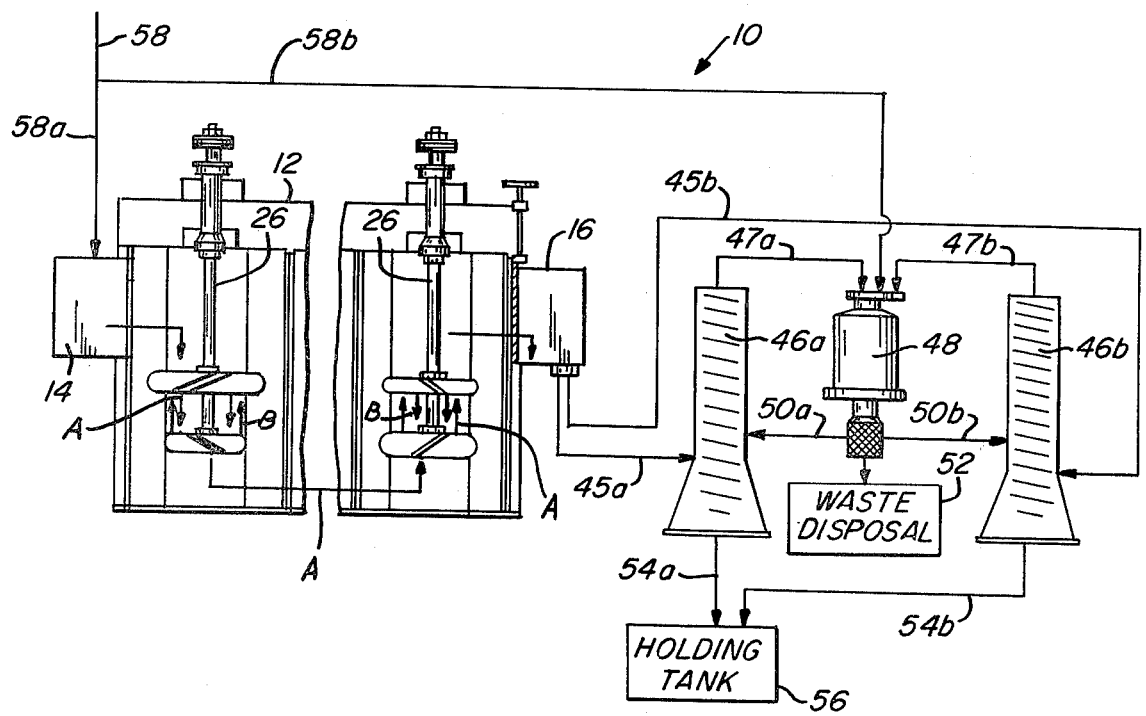

These and other objects and advantages of the invention are more fully specified in the following description with reference to the accompanying figures in which:

FIG. 1 is a partially schematic illustration of a lime slaking system constructed and operable in accord with one embodiment of the instant invention; and FIG. 2 is a partial schematic system illustration similar to FIG. 1 illustrating an alternate embodiment of the invention.

There is generally indicated at 10 in FIG. 1 a lime slaking system constructed and operable according to one embodiment of the instant invention and including an attrition scrubbing apparatus 12 having a feed box 14, a discharge box 16, and a plurality of cells 18a, 18b communicating sequentially in fluid flow relation and arranged such that material feed deposited in feed box 14 is directed through an inlet 20 into the first cell 18a and is then processed sequentially through the cells 18a, 18b to a discharge box outlet 22. Each cell 18a, 18b includes a vessel 24 having associated therewith an agitator means 26 for inducing a countercurrent flow within the material contained in the respective vessel 24. Agitator means 26 is shown as incorporating a pair of spaced impellers 28a, 28b of opposite pitch and of different flow inducement capacity by virtue of differing degree of pitch or differing impeller diameters, or both. The opposing pitch of impellers 28a, 28b induces the desired countercurrent material flow between the respective impeller pairs to provide in each cell 18a, 18b an attrition scrubbing action whereby high intensity rubbing and abrasion between particles of the contained material provides for efficient comminution or size reduction of the feed material particles. The differing impeller flow capacities are provided to induce a net flow of feed material from the inlet of each respective cell 18a, 18b toward the outlet thereof as indicated by arrows A in the figures. The countercurrent flow of material is flow counter to the flow direction of arrows A as indicated by arrows B. Agitators 26 thus operate in concert to provide the desired attrition scrubbing action in each cell 18a, 18b and in addition provide uniform flow sequentially through the cells 18a, 18b from feed box 14. In operation, impeller 28a directs material in descending flow toward the bottom of vessel 24 and impeller 28b is arranged to interrupt the flow and direct a substantial portion of the material countercurrent to the descending flow. As impeller 28a has a greater output capacity, a continuous or progressive descending flow from inlet 20 toward the outlet of cell 18a is maintained, but intense attrition and scouring occur in the zone of countercurrent flow.

During particle travel through each cell 18a, 18b, the movement thereof through the countercurrent flow zone between the impellers 28a, 28b serves to bring each particle into a multitude of contacts with other particle surfaces, and a high concentration of solids in the vessel contents insures ample attrition over the entire particle surface to provide a thorough scouring. The change in direction of flow in successive cells, as shown, assists in bringing new particle surfaces into rubbing contact. Inasmuch as the attrition scrubbing apparatus 12 per se, as described hereinabove, is known and forms no part of the instant invention, further detailed description thereof is not considered necessary. For more detailed description of attrition scrubber apparatus 12 the reader is referred to U.S. Pat. No. 3,054,230, which issued Sept. 18, 1962, to L. H. Logue, and the entire disclosure of which is incorporated herein and made a part hereof by reference.

Outlet 22 of Discharge box 16 communicates in fluid flow relation as by any suitable conduit means 30 with a classifying apparatus such as a spiral classifier 32 for delivery of the attrition scrubber output thereto. In a pool area of classifier 32 particles larger than a predetermined size are separated from the remainder of the contained material by spiral rake means 34 and the separated particles are directed by way of any suitable conveying means, shown schematically at 36, to a milling device such as a ball mill 38 for grinding thereof. The ground particles are separated from waste materials in a separator means 40 which may be a screen separator portion of ball mill 38, for example, and are recycled to the pool area of classifier 32 for further processing. The waste material from separator means 40 is directed to any suitable waste disposal facility 42.

All material input to classifier 32 which is smaller than the predetermined size for separation remains in the pool area of classifier 32 and ultimately is directed as by overflowing a weir or dam (not shown) into a storage facility such as a holding tank 44.

In the context of the present invention the respective vessels 24 of attrition scrubbing apparatus 12 provide reaction chamber means to contain a hydration process of quicklime and water while spiral classifier 32, ball mill 38 and separator means 40 provide for processing of any residual solids larger than a predetermined size. These may include quicklime residuals and particulate contaminants remaining after virtual 100 percent completion of the lime hydration process in attrition scrubber 12. Accordingly, the flow of feed material may be constituted of quicklime particles or formed pellets and water, these components being directed together or separately into feed box 14 of attrition scrubber 12 to form a mixture in the proportion of, for example, approximately 25 to 30 percent solids concentration. If desired, feed box 14 may be utilized for the input of quicklime only into a quicklime and water mass contained within the first cell 18a of scrubber 12 with additional water being added as needed directly into cell 18a. For operation of the system each cell 18a, 18b is filled with quicklime and water mixture, and the mixture is subjected to a vigorous countercurrent flow attrition scrubbing action induced by the respective agitator means 26 in each cell 18a, 18b and indicated by oppositely directed arrows A and B, whereby the abrasion of quicklime pellets against one another is effective to produce a receding surface reaction mechanism and the continuously forming hydrated lime surface is continuously removed from the pellets as fresh, unreacted quicklime is exposed to the water for further hydration. Thus, as a result of the mechanics of the agitation process and the use of a much higher than usual lime solids concentration, the hydration reaction may proceed at a greater rate than it would without the benefit of these innovations and without need of 100 percent grinding. In addition, agitators 26, by virtue of differing flow capacites of their impellers 28a, 28b, also induce a net flow of the lime and water mass sequentially from one cell to the next as shown by the arrows A generally indicating the path of flow.

Of course, it will be appreciated that inasmuch as attrition scrubber 12 is shown partially broken away, additional scrubber cells similar in all respects to the illustrated cells 18a, 18b may be included in the intervening space between cells 18a, 18b. By the judicious selection of attrition scrubber cell size, impeller capacities and other system design parameters including lime slurry density, the hydration reaction may be carried virtually to 100 percent completion in attrition scrubber 12 such that the system output is substantially 100 percent hydrated or slaked lime with only small residual quantities of unreacted quicklime remaining. To separate these residuals and any particulate contaminants, for example silica contaminants, from the slaked lime mass the discharge flow from outlet 22 is directed by way of conduit 30 to the pool area of spiral classifier 32 wherein the hydrated lime mass is separated from the quicklime residuals and particulate contaminants. The separated quicklime residuals and contaminants are directed to ball mill 38 for additional processing while the hydrated lime mass continuously overflows the weir in the spiral classifier pool and is directed into holding tank 44 for eventual use as desired. The quicklime residuals and particulate contaminants are milled in mill 38. Milling of the quicklime residuals tends to promote further hydration whereby the lime residuals are reduced to fines of smaller size than the ground contaminant particles. Thus, the milled material is processed through separator means 40 with the lime residuals being returned to the pool area of classifier 32 for additional processing and other particulates being directed to waste disposal facility 42.

It will be appreciated that although a certain minimal amount of lime hydration occurs in the ball mill 28a and classifier 32, it is nevertheless an object of the invention that the vast majority of the hydration of lime pellets occur in attrition scrubbing apparatus 12 whereas classifier 32 and ball mill 38 function primarily as separation and comminution devices. Therefore, a far smaller milling capacity is required for the described system than in many prior systems in which 100 percent grinding of the quicklime input to the reaction vessel was required, or in those prior systems in which the mill itself is the reaction vessel. The attrition scrubbing apparatus 12, by providing a relatively violent countercurrent flow condition in a plurality of cells, promotes an efficient, uniform lime slaking reaction in a manner superior to heretofore known lime slaking systems and without requiring milling capacity equivalent to the total mass transfer capacity of the system.

In FIG. 2 there is shown an alternate embodiment of the instant invention in which the discharge flow of hydrated lime from discharge box 16 may be directed in parallel via conduits 45a, 45b to a respective pair of spiral classifiers 46a, 46b, each of which is in closed circuit via conduits 47a, 47b with a single ball mill 48 for processing of the separated particulate contaminant and quicklime residuals as in the embodiment of FIG. 1. The separator portion of ball mill 48 feeds ground lime residuals via conduits 50a, 50b to each of spiral classifiers 46a, 46b, and feeds waste byproducts to waste disposal facility 52. The parallel connected spiral classifiers 46a, 46b may feed the hydrated lime via conduits 54a, 54b to a common holding tank 56 as shown, or may direct their separate outputs to different storage facilities (not shown) for use in different processes. Depending upon the desired process parameters, spiral classifiers 46a, 46b may be of different size, capacity, separation capability, and so forth to provide differing grades of hydrated lime.

Additionally shown in FIG. 2 is a branch feed line 58 whereby a feed flow of quicklime or quicklime and water mix may be directed partially to feed box 14 of attrition scrubbing apparatus 12 via branch 58a and partially to ball mill 48 via branch 58b. This alternative would provide such advantages as permitting closer control of the water content in the hydrated lime mass by the selective addition directly into ball mill 48 of quicklime which, along with the quicklime residuals from classifiers 46a, 46b, would be ground and recycled to spiral classifiers 46a, 46b. In this way the net amount of unhydrated residual lime recycled to classifiers 46a, 46b may be selectively increased or decreased to compensate for an excess or shortfall of water. In a similar embodiment (not shown) branch 58b may feed into any part of the system downstream from the last cell 18b and may feed water as an alternative to feeding the lime and water mix or lime alone.

The lime slaking system shown in FIGS. 1 and 2 may include various types of classifying and milling devices of widely varying capacities depending upon the quality of the quicklime and water input to the system and the quality requirements of the slaked lime output. Thus, if the attrition scrubbing process alone, with proper input material, produces slaked lime having a residual quicklime and contaminant content which is consistent with requirements of the end use of the slaked lime, then the residuals classifying and grinding operations may be eliminated. In general, however, some residuals processing capability normally will be required to economically produce slaked lime of acceptable quality.

According to the description hereinabove there is provided by the instant invention a novel apparatus and method for lime slaking wherein vigorous countercurrent flow agitation is applied to a quicklime and water mass to provide a lime slaking system of greater efficiency and economy than prior systems. The invention minimizes the need for grinding, milling and classifying apparatus by providing apparatus in which the hydration process can be carried out with greater efficiency and uniformity than has been heretofore possible in known apparatus of comparable cost and capacity. In addition the method of the invention provides for a lime slaking process not available in heretofore known lime slaking apparatus.

The invention is not intended to be limited to those specific embodiments described hereinabove, but rather may be subject to various modifications without departing from the broad spirit and scope thereof. For example, the specific mechanical design parameters of the described attrition scrubber, classifiers and mills may be varied within a wide range of values, and the specific arrangement of the residuals processing portion of the system may include various known processing units in various system structural arrangements in lieu of or in addition to the illustrated arrangements. These and other embodiments and modifications having been envisioned and anticipated by the inventor, the invention is intended to be interpreted as broadly as permitted by the scope of the claims appended hereto.

What is claimed is:

1. A lime slaking system for the hydration of lime, said system comprising: vessel means for containing a mass of material including unhydrated lime particles and water; said vessel means including at least one reaction chamber to contain such a mass of material during hydration of the lime content of such mass and an inlet for feeding such material into said reaction chamber and an outlet to permit withdrawal of product from said reaction chamber; agitator means associated with said vessel means and operable for agitating such mass of material contained in said reaction chamber; flow inducing means associated with said agitator means and cooperable therewith to promote movement of such contained mass of material from said inlet toward said outlet; first comminution means integral with said agitator means and concomitantly movable therewith for comminution of the lime particle content of such mass of material simultaneously with such agitating and such movement thereof in a manner to promote high intensity inter particle contacts between such lime particles in such mass for driving such hydration reaction at a reaction rate greater than the spontaneous hydration rate of such lime particles through a receding surface reaction mechanism to produce within said reaction chamber a product mass including a hydrated lime component and a residual component; processing means communicating with said outlet of said reaction chamber to receive such product from said reaction chamber for processing thereof; said processing means including classifying means for separating such product into such hydrated lime component and such residual component and second comminution means associated with said classifying means for comminution of such residual component and recycling of at least a portion of such residual component to said classifying means for additional processing thereof through said processing means.

2. The improvement as claimed in claim 1 wherein said reaction chamber includes a plurality of reaction chambers and said agitator means includes a respective plurality of agitator units with one of said agitator units being associated with each of said reaction chambers.

3. The improvement as claimed in claim 1 wherein said agitator means includes multiple impeller means of differing magnitudes of flow inducing capacity.

4. The improvement as claimed in claim 3 wherein said multiple impeller means are rotary impellers of differing magnitudes of pitch.

5. The improvement as claimed in claim 3 wherein said rotary impellers are of differing diameters.

6. The improvement as claimed in claim 4 or 5 wherein said rotary impellers are driven by a common drive means.

7. A lime slaking system as claimed in claim 1 wherein said vessel means includes a plurality of said reaction chambers connected in series relationship for progressive flow of such mass of material serially through said plurality of said reaction chambers.

8. A lime slaking system as claimed in claim 7 wherein said classifying means includes a spiral classifier.

9. A lime slaking system as claimed in claim 8 wherein said second comminution means includes a ball mill.

* * * * *

REEXAMINATION CERTIFICATE (41st)

United States Patent [19]

Gisler

[11] B1 4,261,953

[45] Certificate Issued Jan. 11, 1983

[54] LIME SLAKING APPARATUS

[75] Inventor: Henry J. Gisler, Denver, Colo.

[73] Assignee: Joy Manufacturing Company, Pittsburgh, Pa.

Reexamination Request
No. 90/000,122, Dec. 10, 1981

Reexamination Certificate for:
Patent No.: 4,261,953
Issued: Apr. 14, 1981
Appl. No.: 16,260
Filed: Feb. 28, 1979

[51] Int. Cl.³ .......................... C04B 1/08; B01F 7/20
[52] U.S. Cl. .................................. 422/162; 422/225
[58] Field of Search ............... 422/162, 225; 423/640

[56] References Cited

U.S. PATENT DOCUMENTS

| | | |
|---|---|---|
| 1,780,821 | 11/1930 | Henderson. |
| 1,936,806 | 11/1933 | Thomas. |
| 1,965,268 | 7/1934 | Thomsen. |
| 3,044,857 | 7/1962 | Sable. |
| 3,965,240 | 6/1976 | Hughey. |

OTHER PUBLICATIONS

Robert S. Boynton, Chemistry and Chemistry and "Technology of Lime and Limestone," 1966, pp. 326–333, (Interscience Publishers).

"Lime Handling Application and Storage in Treatment Process," Bulletin 213; National Lime Assoc.; Washington, D.C.; 5/76; front piece and pages V, 48–69 & 74.

*Primary Examiner*—Barry Richman

[57] ABSTRACT

An improved lime slaking system including agitator means effective for mechanical comminution of particulate lime during the hydration thereof.

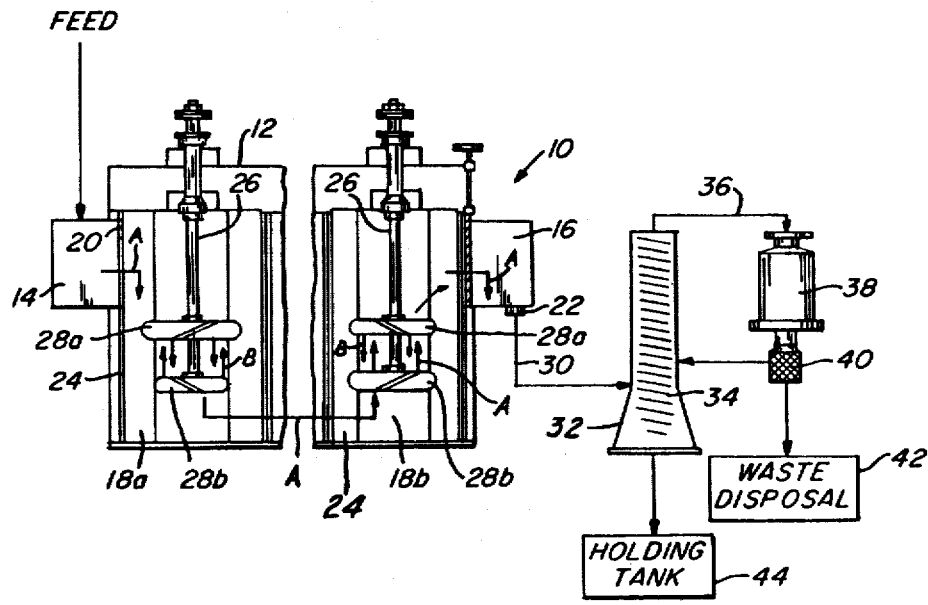

REEXAMINATION CERTIFICATE ISSUED UNDER 35 U.S.C. 307.

THE PATENT IS HEREBY AMENDED AS INDICATED BELOW.

Matter enclosed in heavy brackets appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended:

1. A lime slaking system for the hydration of lime, said system comprising: vessel means for containing a mass of material including at least one reaction chamber to contain such a mass of material during hydration of the lime content of such mass and an inlet for feeding such material into said reaction chamber and an outlet to permit withdrawal of product from said reaction chamber; agitator means, *including impellers,* associated with said vessel means and operable for agitating such mass of material contained in said reaction chamber; flow inducing means [associated] *integral* with said [agitator means] *impellers* and cooperable therewith to promote movement of such contained mass of material from said inlet toward said outlet; first comminution means integral with said *impellers* [agitator means] and concomitantly movable therewith for comminution of the lime particle content of such mass of material simultaneously with such agitating and such movement thereof in a manner to promote high intensity inter particle contacts between such lime particles in such mass for driving such hydration reaction at a reaction rate greater than the spontaneous hydration rate of such lime particles through a receding surface reaction mechanism to produce within said reaction chamber a product mass including a hydrated lime component and a residual component; processing means communicating with said outlet of said reaction chamber to receive such product from said reaction chamber for processing thereof; said processing means including classifying means for separating such product into such hydrated lime component and such residual component and second comminution means associated with said classifying means for comminution of such residual component and recycling of at least a portion of such residual component to said classifying means for additional processing thereof through said processing means.

Claims 2–9, dependent on amended claims, are determined to be patentable.

* * * * *